(12) United States Patent
Kanezaki et al.

(10) Patent No.: US 10,948,129 B2
(45) Date of Patent: Mar. 16, 2021

(54) HIGH PRESSURE TANK

(71) Applicant: HONDA MOTOR CO., LTD., Tokyo (JP)

(72) Inventors: Toshihiko Kanezaki, Wako (JP); Yusuke Ishikawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/278,922

(22) Filed: Feb. 19, 2019

(65) Prior Publication Data

US 2019/0257474 A1 Aug. 22, 2019

(30) Foreign Application Priority Data

Feb. 21, 2018 (JP) .............................. JP2018-028512

(51) Int. Cl.
 *F17C 1/08* (2006.01)

(52) U.S. Cl.
 CPC ........ *F17C 1/08* (2013.01); *F17C 2201/0109* (2013.01); *F17C 2203/012* (2013.01); *F17C 2203/0604* (2013.01); *F17C 2203/066* (2013.01); *F17C 2203/0619* (2013.01); *F17C 2203/0636* (2013.01); *F17C 2205/0302* (2013.01); *F17C 2221/012* (2013.01); *F17C 2270/0168* (2013.01); *F17C 2270/0184* (2013.01)

(58) Field of Classification Search
 CPC ...... F17C 1/08; F17C 2203/0619; F17C 1/06; F17C 2270/0184; F17C 2270/0168; F17C 2203/0621; F17C 2203/0663; F17C 2205/0305
 See application file for complete search history.

(56) References Cited

U.S. PATENT DOCUMENTS

| 5,287,988 A | * | 2/1994 | Murray | ................... | F16J 12/00 |
| | | | | | 220/589 |
| 2017/0268724 A1* | | 9/2017 | Kanezaki | ................. | F17C 1/04 |

FOREIGN PATENT DOCUMENTS

| JP | 2004-211783 | 7/2004 |
| JP | 2017-129193 | 7/2017 |
| JP | 2017-166535 | 9/2017 |

OTHER PUBLICATIONS

Japanese Office Action for Japanese Patent Application No. 2018-028512 dated Aug. 27, 2019.

* cited by examiner

*Primary Examiner* — Don M Anderson
(74) *Attorney, Agent, or Firm* — Amin, Turocy & Watson LLP

(57) ABSTRACT

A high pressure tank includes: a liner made of a resin; a reinforced layer covering an outer surface of the liner; and a cap having formed therein a supplying/discharging hole for supplying/discharging a fluid to/from the liner. This cap includes: a flange section interposing between the liner and the reinforced layer; and an exposed section exposed from the reinforced layer. Furthermore, in this high pressure tank, a protective member is arranged between the flange section and the reinforced layer.

4 Claims, 3 Drawing Sheets

HIGH PRESSURE TANK

CROSS-REFERENCE TO RELATED APPLICATION

This application is based upon and claims the benefit of priority from Japanese Patent Application No. 2018-028512 filed on Feb. 21, 2018, the contents of which are incorporated herein by reference.

BACKGROUND OF THE INVENTION

Field of the Invention

The present invention relates to a high pressure tank that includes a liner, a reinforced layer, and a cap.

Description of the Related Art

A high pressure tank is widely used as a container for storing a fluid such as a gas or a liquid. For example, the high pressure tank is installed in a fuel cell vehicle as a container for storing hydrogen gas to be supplied to a fuel cell system.

As an example of this kind of high pressure tank, there is known a high pressure tank that includes: a liner, made of a resin, that stores the fluid on a hollow inside thereof; a reinforced layer, made of a fiber-reinforced resin, that covers an outer surface of the liner in order to reinforce the liner; and a cap having formed therein a supplying/discharging hole for supplying/discharging the fluid to/from the hollow inside of the liner. This supplying/discharging hole is provided with the likes of a valve, for example. By operating the valve, and so on, it is possible for the fluid to be supplied to the inside of the liner, or, conversely, for the fluid stored on the inside of the liner to be discharged, via the supplying/discharging hole.

Japanese Laid-Open Patent Publication No. 2017-166535 discloses a high pressure tank that includes: a flange section interposing between the liner and the reinforced layer; and a cap having an exposed section exposed from the reinforced layer. In this case, a configuration is attained whereby, due to the flange section being sandwiched by the liner and the reinforced layer, retention of the cap is effected, and, due to the exposed section being exposed from the reinforced layer, the above-described supplying/discharging of the fluid can be easily performed.

The high pressure tank of such configuration is obtained by the cap being attached to the liner, after which a reinforced fiber is wound around the liner and the flange section of the cap, and the reinforced fiber is further impregnated with a resin.

SUMMARY OF THE INVENTION

As may be understood by referring to FIG. 1 of Japanese Laid-Open Patent Publication No. 2017-166535, a corner section of an outer circumferential edge section of the flange section of the cap is formed in an acute-angled edge shape. This results in it being avoided that a level difference occurs in a boundary of the flange section and the liner, or that the liner or reinforced fiber is damaged due to this level difference.

Now, the high pressure tank undergoes supplying/discharging of the fluid. Consequently, an internal pressure of the high pressure tank changes, so application and release of a load are repeated on the flange section. The outer circumferential edge section of the flange section has an acute-angled shape as described above, and is thin. Therefore, the outer circumferential edge section is considered to be a region where fatigue breakdown readily occurs due to repetition of application and release of the load.

A main object of the present invention is to provide a high pressure tank capable of dispelling concern that fatigue breakdown occurs in a circumferential edge section of a flange section configuring a cap.

According to an embodiment of the present invention, there is provided a high pressure tank including: a liner made of a resin; a reinforced layer covering an outer surface of the liner; and a cap having formed therein a supplying and discharging hole for supplying a fluid to the liner or discharging the fluid from the liner, the cap including: a flange section interposing between the liner and the reinforced layer; and an exposed section exposed from the reinforced layer, and there being arranged between the flange section and the reinforced layer a protective member filled into a clearance between the flange section and the reinforced layer.

The liner expands or contracts as the fluid is supplied/discharged. In the case that there exists between the flange section and the reinforced layer a protective member filled into the clearance, a load from the liner is applied to the protective member when the liner expands. That is, the load is dispersed to the protective member. Therefore, it is avoided that stress concentrates in the cap, so it is suppressed that fatigue accumulates in a circumferential edge section thinner compared to another region, of the cap. This makes it possible to dispel concern that fatigue breakdown occurs particularly in the circumferential edge section.

It is preferable that a circumferential edge section of the flange section is provided with: a first corner section facing the liner; a second corner section facing the reinforced layer; and a flat side surface extending from the first corner section to the second corner section. In this case, the circumferential edge section does not have an acute-angled edge shape, but has a certain degree of thickness. Therefore, it becomes even more difficult for fatigue to be accumulated in the circumferential edge section, so occurrence of fatigue breakdown is even more suppressed.

Furthermore, it is preferable that a part of the protective member enters (is engaged) between the liner and the reinforced layer. This results in the protective member having its position firmly fixed.

It is preferable that the protective member is made of a resin. In this case, the protective member shows elasticity. Therefore, when the liner expands, the protective member is crushed in an elastic deformation region. Due to this crushing, a pressing force on the reinforced layer from the liner or a reaction force on the liner from the reinforced layer, is relieved. That is, the load applied to the liner or the reinforced layer gets smaller. Therefore, it is avoided that stress concentrates in the liner or the reinforced layer, and, as a result, it is suppressed that fatigue is accumulated in the liner or the reinforced layer.

Due to the present invention, a configuration is adopted whereby a flange section of a cap and a reinforced layer configuring a high pressure tank have interposed between them a protective member filled into a clearance between the two. When a liner has expanded by a fluid being supplied inside the high pressure tank, a pressing force (a load) on the cap of the liner is dispersed to the protective member. Therefore, it is avoided that the load concentrates in the cap. As a result, it is suppressed that fatigue accumulates in a circumferential edge section thinner compared to another region, of the cap, so it is possible to dispel concern that fatigue breakdown occurs particularly in the circumferential edge section.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

A preferred embodiment of a high pressure tank according to the present invention will be presented and described in detail below with reference to the accompanying drawings.

Figure 1:
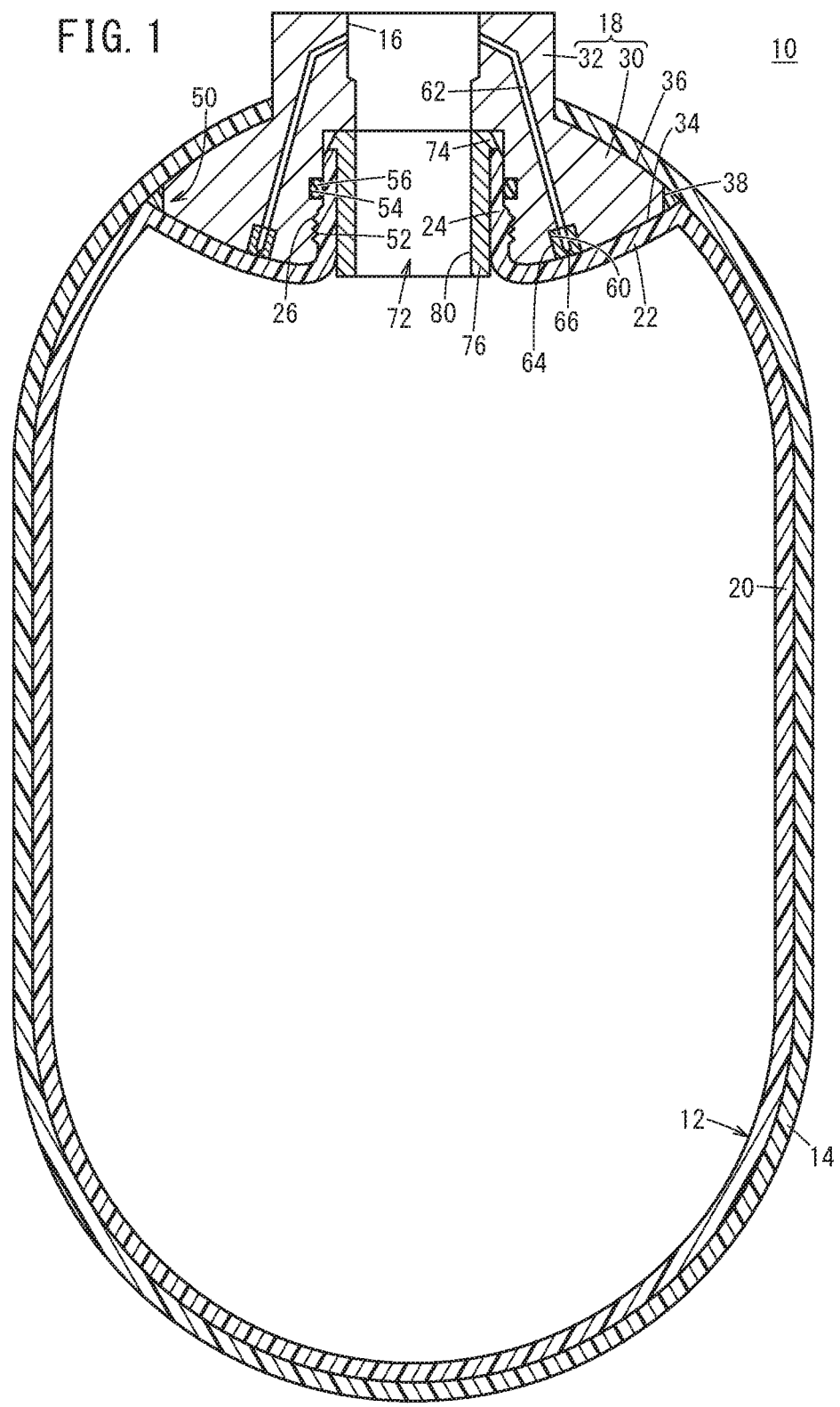
FIG. 1 is an overall schematic cross-sectional side view along an axis direction of a high pressure tank according to an embodiment of the present invention.

FIG. 1 is an overall schematic cross-sectional side view along an axis direction of a high pressure tank 10 according to the present embodiment. This high pressure tank 10 includes: a liner 12 as an inner layer; a reinforced layer 14 as an outer layer; and a cap 18 having formed therein a supplying/discharging hole 16.

The liner 12 is a hollow body configured from a resin, and is capable of storing on its inside various kinds of fluids such as hydrogen gas, for example. The liner 12 includes: a main body section 20 whose outer surface is covered by the reinforced layer 14; a sunken section 22 that sinks toward an inside of the main body section 20; and a cylindrical section 24 that projects from the sunken section 22 toward an outside of the main body section 20. An outer circumferential wall of the cylindrical section 24 is provided with a male screw thread 26.

Moreover, the reinforced layer 14 is configured from a fiber-reinforced resin. The reinforced layer 14 is provided by winding a reinforced fiber around the liner 12 and then impregnating the reinforced fiber with a matrix resin. A carbon fiber and an epoxy-based resin may be respectively cited as typical preferred examples of the reinforced fiber and the matrix resin.

The cap 18 is configured from a metal, for example, and includes: a flange section 30 interposing between the liner 12 and the reinforced layer 14; and an exposed section 32 integrally connected to the flange section 30 and of smaller diameter compared to the flange section 30. The cap 18 is configured such that the flange section 30, together with the liner 12, are covered by the reinforced layer 14, and such that the exposed section 32 projects so as to be exposed from an opening of the reinforced layer 14.

Figure 2:
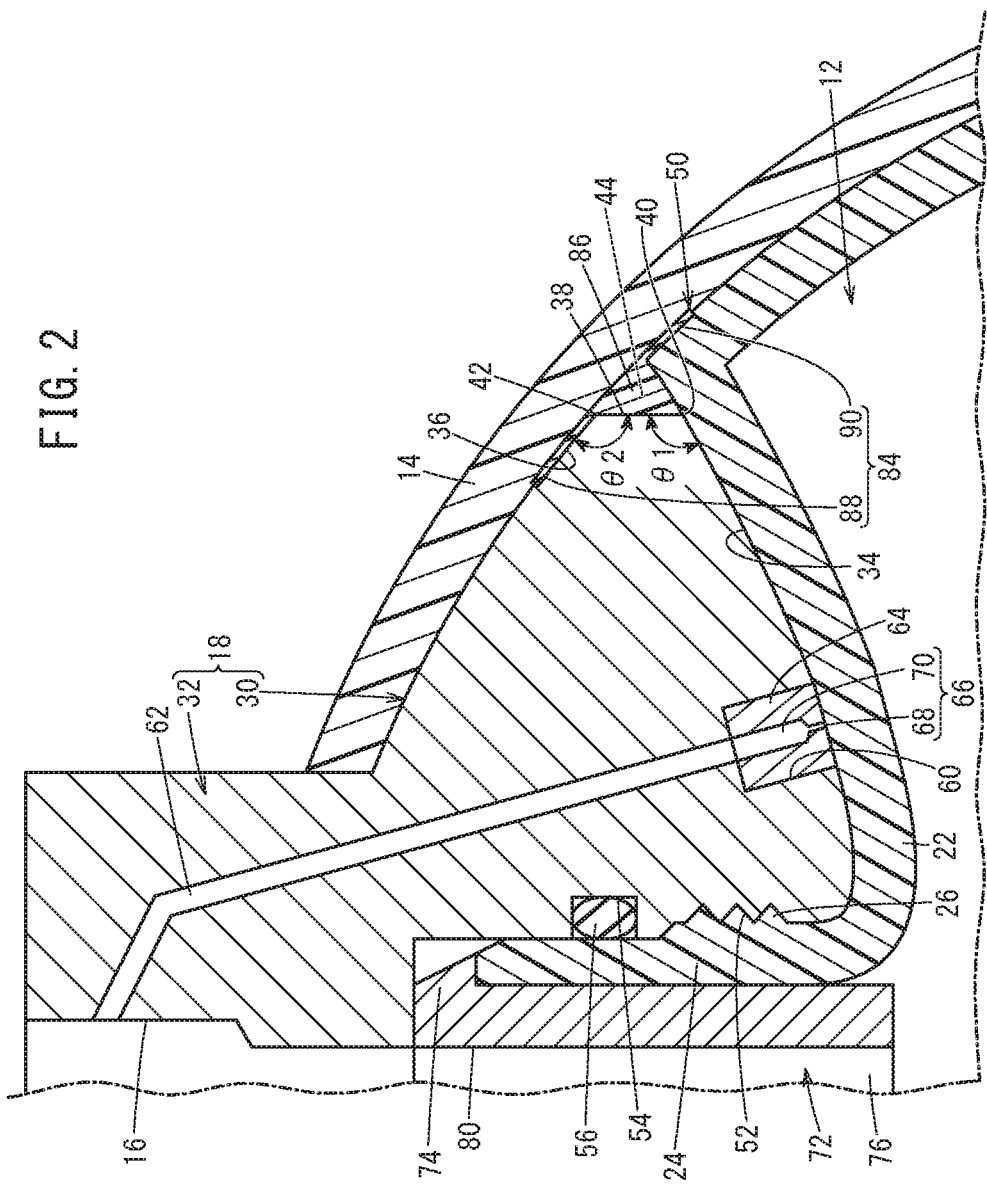
FIG. 2 is an enlarged cross-sectional view of essential parts in a vicinity of a cap of the high pressure tank of FIG. 1.

Therefore, as shown in detail in FIG. 2, the flange section 30 includes: a liner-side abutting end surface 34 that abuts on an outer surface of the sunken section 22 of the liner 12; and a reinforced layer-covered end surface 36 that, together with the liner 12, is covered by the reinforced layer 14. An outer circumferential edge section of the flange section 30 is shaped as though having been cut off along an axis direction of the exposed section 32, spanning from the liner-side abutting end surface 34 to the reinforced layer-covered end surface 36. As a result, a flat side surface 38 interposes between the liner-side abutting end surface 34 and the reinforced layer-covered end surface 36. The flat side surface 38 has a certain length along the axis direction of the exposed section 32.

A first corner section 40 is formed by intersection of the liner-side abutting end surface 34 and the flat side surface 38, and a second corner section 42 is formed by intersection of the flat side surface 38 and the reinforced layer-covered end surface 36. The first corner section 40 faces the liner 12, and the second corner section 42 faces the reinforced layer 14. Angles of these first corner section 40 and second corner section 42, in other words, an intersection angle θ1 of the liner-side abutting end surface 34 and the flat side surface 38, and an intersection angle θ2 of the flat side surface 38 and the reinforced layer-covered end surface 36, are both obtuse angles.

Due to the flat side surface 38 being formed, a ring-shaped clearance 44 is partitioned as a space enclosed by the flat side surface 38, the liner 12, and the reinforced layer 14. As will be mentioned later, the ring-shaped clearance 44 is filled with a part of a protective member 50.

The supplying/discharging hole 16 extends spanning from the flange section 30 to the exposed section 32. A female screw thread 52 is formed in an inner circumferential wall of the supplying/discharging hole 16, and the previously described male screw thread 26 is screwed into the female screw thread 52. This screwing results in the cap 18 being externally installed in the cylindrical section 24.

A seal groove 54 sunken in a ring shape is formed more to an upstream side in a fluid supplying direction than the female screw thread 52. A seal member 56 configured from an O ring is arranged on an inside of this seal groove 54. The seal member 56 seals any gap between an outer circumferential surface of the cylindrical section 24 and an inner circumferential surface of the supplying/discharging hole 16.

The cap 18 has further formed therein an insertion hole 60 and a cap-side path 62 whose cross-sectional shapes are each circular. The insertion hole 60 extends with a certain length from the liner-side abutting end surface 34 toward an exposed section 32 side of the flange section 30, and communicates with one end side of the cap-side path 62. A plurality of the insertion holes 60 and the cap-side paths 62 are provided at fixed intervals in a circumferential direction of the cap 18.

A plug 64 is inserted in the insertion hole 60. The plug 64 is a cylindrical body formed from a similar metal to the cap 18, for example, and has formed therein penetrating along its axial direction a plug-side path 66. The plug-side path 66 is configured from: a small diameter path 68 formed on one end side in the axial direction of the plug 64; and a large diameter path 70 connected to the small diameter path 68 and whose inner diameter is slightly larger than that of the small diameter path 68. A diameter of the large diameter path 70 is set to be substantially the same as a diameter of the cap-side path 62.

The plurality of cap-side paths 62 are bent such that after extending slightly inclined with respect to the axis direction of the high pressure tank 10, they are directed toward the inner circumferential surface of the supplying/discharging hole 16, so as to focus as they are directed along the inside of the cap 18 from the insertion hole 60 toward the exposed section 32.

The plug-side path 66 and the cap-side path 62 formed as above function as a fluid guiding path by which the fluid that has entered between the liner 12 and the cap 18 is guided to the supplying/discharging hole 16.

A collar 72 is further arranged on the inside of the supplying/discharging hole 16. The collar 72 is made of a metal, for example, and includes: a head section 74 of circular ring shape; and a cylinder section 76 of cylindrical shape provided integrally with the head section 74 and of smaller diameter compared to the head section 74. The cylindrical section 24 is sandwiched by an outer circumferential surface of the cylinder section 76 and the inner circumferential surface of the supplying/discharging hole 16 of the flange section 30, and is thereby firmly supported. Moreover, a passage hole 80 communicating with the supplying/discharging hole 16 is formed penetrating along an axis direction of the cylinder section 76, in the collar 72.

Furthermore, the protective member 50 is arranged between the flange section 30 and the reinforced layer 14. The protective member 50 includes: a circular ring-shaped main body section 84 formed in a substantially circular ring-like shape; and a ring-shaped projection 86 projecting from the circular ring-shaped main body section 84 and having a substantially triangular shape in cross section. As may be understood from FIG. 2, the ring-shaped projection 86 projects oriented toward the liner 12 from an end surface on a side facing the liner 12, of the circular ring-shaped main body section 84.

The ring-shaped projection 86 enters the ring-shaped clearance 44, and abuts on the flat side surface 38 of the cap 18 and on the liner 12. That is, the ring-shaped projection 86 is filled into the ring-shaped clearance 44.

On the other hand, the circular ring-shaped main body section 84 is broader compared to the ring-shaped projection 86. Therefore, the circular ring-shaped main body section 84 includes: a first sandwiched region 88 sandwiched between the flange section 30 of the cap 18 and the reinforced layer 14; and a second sandwiched region 90 sandwiched between the liner 12 and the reinforced layer 14. In other words, the first sandwiched region 88 is filled into a slight clearance between the flange section 30 and the reinforced layer 14, and the second sandwiched region 90 is filled into a slight clearance between the liner 12 and the reinforced layer 14. As a result, the protective member 50 has its position firmly fixed by the liner 12, the reinforced layer 14 and the cap 18.

Although shown exaggerated in FIG. 2, a thickness of the circular ring-shaped main body section 84 is extremely small. As a result, a level difference formed by the second sandwiched region 90 and the liner 12 is extremely slight. Therefore, it can be avoided that a stress acts on the reinforced fiber when the reinforced fiber is wound around the liner 12 in order to form the reinforced layer 14.

The protective member 50 configured in this way can be manufactured by, for example, injection molding molten polyethylene.

The high pressure tank 10 according to the present embodiment which is basically configured as above, will next have its operational advantages described.

When a fluid such as hydrogen is stored on the inside of the high pressure tank 10, the fluid passes through the supplying/discharging hole 16 of the flange section 30 and the passage hole 80 of the collar 72, to be supplied to the hollow inside of the liner 12. At this time, the liner 12 slightly expands due to its internal pressure rising. On the other hand, when the stored fluid is released, the fluid passes through the passage hole 80 of the collar 72 and the supplying/discharging hole 16 of the cylindrical section 24, to be discharged from the hollow inside of the liner 12. The liner 12 thereby slightly contracts by the internal pressure falling.

As the liner 12 expands by being supplied with the fluid, a load is applied to the flange section 30 of the cap 18. This load is released by the liner 12 contracting when the fluid is discharged. Therefore, repetition of supplying/discharging of the fluid to/from the high pressure tank 10 causes application and release of the load on the flange section 30 to be repeated.

Now, in the present embodiment, as shown in FIG. 2, as well as the flat side surface 38 extending with a certain length being formed in the outer circumferential edge section of the flange section 30, the obtuse-angled first corner section 40 interposes between the liner-side abutting end surface 34 and the flat side surface 38, and the obtuse-angled second corner section 42 interposes between the flat side surface 38 and the reinforced layer-covered end surface 36. That is, an acute-angled edge shaped section does not exist in the outer circumferential edge section of the flange section 30.

In other words, the outer circumferential edge section of the flange section 30 is thick. As a result, it is difficult for fatigue to be accumulated, even when application and release of the load are repeated. It therefore becomes difficult for fatigue breakdown to occur in the flange section 30. That is, it is possible to dispel concern that fatigue breakdown occurs in the outer circumferential edge section of the flange section 30.

Figure 3:
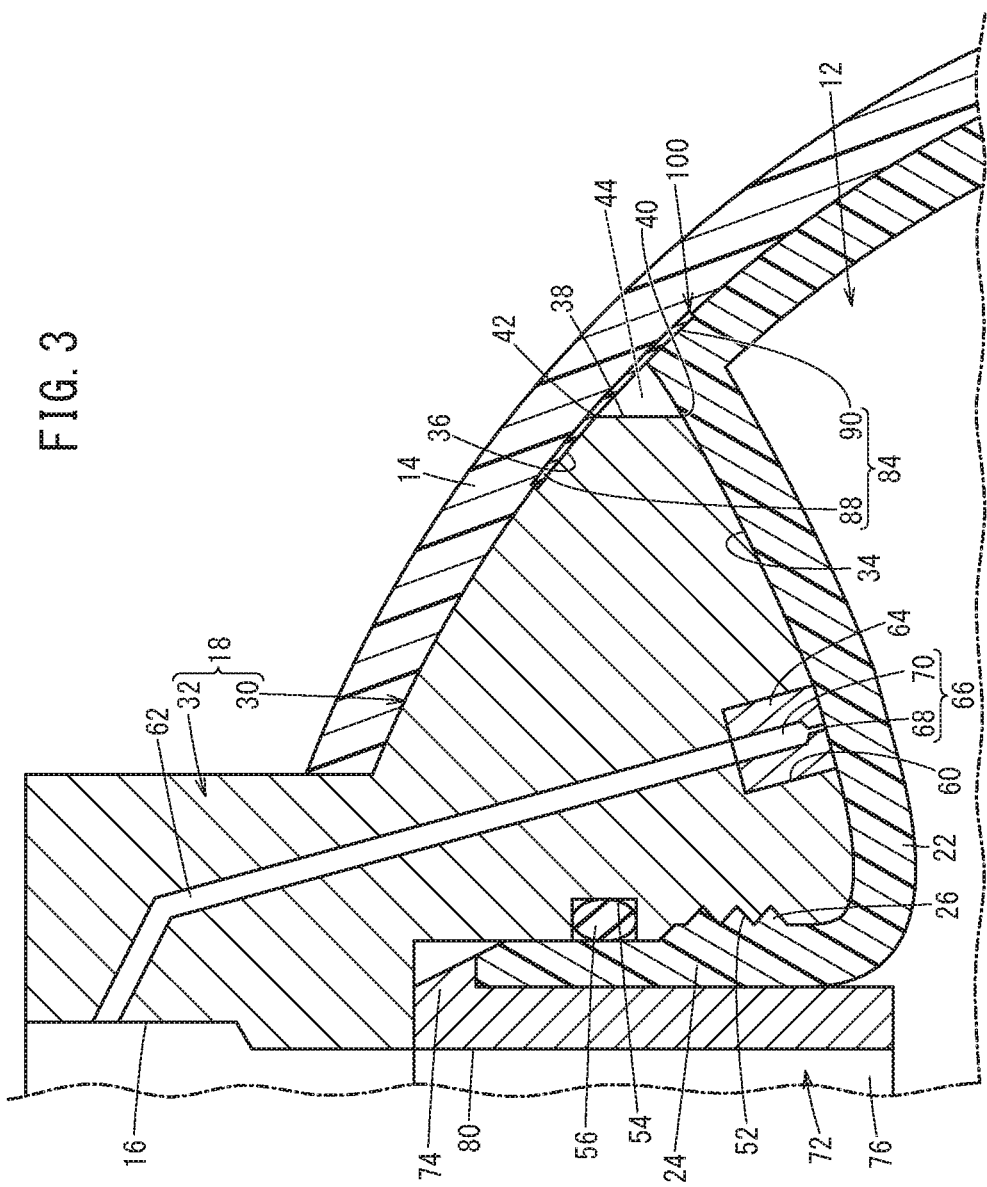
FIG. 3 is an enlarged cross-sectional view of essential parts in a vicinity of a cap of a high pressure tank employing a protective member unable to fill a clearance.

As shown in FIG. 3, if a protective member 100 not having the ring-shaped projection 86 is employed, then, in the ring-shaped clearance 44 partitioned by the flat side surface 38, the liner 12, and the reinforced layer 14, the first corner section 40 abuts on the liner 12. As a result, stress concentrates in a place abutted on by the first corner section 40, of the liner 12. Consequently, there is concern that when supplying/discharging of the fluid to/from the high pressure tank 10 is repeated, fatigue is accumulated in the previously described abutted-on place.

In contrast, in the present embodiment, the ring-shaped clearance 44 is filled with the ring-shaped projection 86 of the protective member 50 (refer to FIG. 2). As a result, the place abutted on by the first corner section 40, of the liner 12 is abutted on also by a top of the ring-shaped projection 86. Therefore, when the liner 12 expands, the load applied from the liner 12 is dispersed to the flange section 30 and the protective member 50. That is, it is avoided that stress concentrates in the abutted-on place, hence it is avoided that fatigue breakdown occurs due to fatigue being accumulated in the abutted-on place.

Thus, in the present embodiment, the protective member 50 interposes between the flange section 30 and the reinforced layer 14 to be filled into a clearance between the two (including the ring-shaped clearance 44), so it is possible to dispel concern that fatigue breakdown occurs in the liner 12.

Moreover, the protective member 50 shows sufficient elasticity due to being configured from a resin. Therefore, when the cap 18 is pressed by the liner 12 expanding, the protective member 50 is slightly crushed. This crushing results in a pressing force (a load) from the cap 18 toward the reinforced layer 14 being relieved. Therefore, a reaction force from the reinforced layer 14 acting on the cap 18 becomes smaller. As a result, the load acting on the cap 18 and the reinforced layer 14 becomes smaller, so it is avoided that the cap 18 or the reinforced layer 14 is damaged.

In addition, the ring-shaped projection 86 is also crushed, so in regions abutting on the ring-shaped projection 86, of the liner 12 and the reinforced layer 14, the pressing force from the liner 12 or the reaction force from the reinforced layer 14 is also relieved. Therefore, the liner 12 is also protected.

Ultimately, by installing between the flange section 30 and the reinforced layer 14 the protective member 50 having the ring-shaped projection 86, it becomes difficult for the liner 12 or reinforced layer 14 and the cap 18 to be damaged. That is, the high pressure tank 10 can be configured to have excellent durability.

The present invention is not particularly limited to the above-described embodiment, and may be variously modified in a range not departing from the scope of the present invention.

For example, the protective member may be configured without either one of the first sandwiched region 88 or the second sandwiched region 90 being provided.

What is claimed is:

1. A high pressure tank comprising: a liner made of a resin; a reinforced layer covering an outer surface of the liner; and a cap having formed therein a supplying and discharging hole for supplying a fluid to the liner or discharging the fluid from the liner,
   the liner including a sunken section at one end of the liner, the sunken section toward another end of the liner,
   the cap including: a flange section interposing between the sunken section and the reinforced layer; and an exposed section exposed from the reinforced layer, and
   there being arranged between the flange section and the reinforced layer a protective member filled into a clearance between the flange section and the reinforced layer,
   wherein a circumferential edge section of the flange section is provided with: a first corner section facing the liner; a second corner section facing the reinforced layer; and a flat side surface extending from the first corner section to the second corner section,
   angles of the first corner section and the second corner section are obtuse angles,
   the protective member includes: a circular ring-shape main body section formed in a substantially circular ring-like shape; and a ring-shaped projection projecting from an end surface of the circular ring-shaped main body section and having a substantially triangular shape in cross section, the end surface of the circular ring-shaped main body section facing the sunken section,
   the circular ring-shaped main body section includes a first sandwiched region sandwiched between the flange section and the reinforced layer, and a second sandwiched region sandwiched between the liner and the reinforced layer,
   the ring-shaped projection is positioned between the first sandwiched region and the second sandwiched region, and the ring-shaped projection abuts against the flat side surface on a first ring-shaped projection surface extending through one side forming a vertex of the substantially triangular shape, and abuts against an outer surface of the sunken section on a second ring-shaped projection surface extending through another side forming the vertex of the substantially triangular shape.

2. The high pressure tank according to claim 1, wherein the clearance is formed between the flat side surface, the reinforced layer, and the liner, and the protective member is arranged in the clearance.

3. The high pressure tank according to claim 1, wherein the protective member is formed of a resin.

4. The high pressure tank according to claim 1, wherein the cap is formed of a metal.

\* \* \* \* \*